INVENTORS.
WILMER C. ANDERSON
FRANK P. RENNIE
BY
ATTORNEY.

May 9, 1967 W. C. ANDERSON ETAL 3,319,225

REMOTE CONTROL SYSTEM INCLUDING A FREQUENCY DISCRIMINATING DELAY CIRCUIT

Filed Jan. 22, 1963 3 Sheets-Sheet 2

INVENTORS.
WILMER C. ANDERSON
FRANK P. RENNIE
BY
ATTORNEY.

May 9, 1967 W. C. ANDERSON ET AL 3,319,225

REMOTE CONTROL SYSTEM INCLUDING A FREQUENCY DISCRIMINATING DELAY CIRCUIT

Filed Jan. 22, 1963 3 Sheets-Sheet 3

INVENTORS.
WILMER C. ANDERSON
FRANK P. RENNIE
BY
[signature]
ATTORNEY.

United States Patent Office 3,319,225

Patented May 9, 1967

3,319,225

REMOTE CONTROL SYSTEM INCLUDING A FREQUENCY DISCRIMINATING DELAY CIRCUIT

Wilmer C. Anderson, Greenwich, and Frank P. Rennie, Stamford, Conn., assignors to General Time Corporation, New York, N.Y., a corporation of Delaware Filed Jan. 22, 1963, Ser. No. 253,193
16 Claims. (Cl. 340—147)

The present invention relates to a remote control system including a frequency discriminating circuit and more specifically to a frequency controlled, remote control system including a frequency discriminating circuit capable of discriminating between a large number of channels of information transmitted over a relatively small band width.

A primary object of this invention is to provide a frequency discriminating circuit for separating different carriers transmitted over a relatively small band width, but which does not require tuned elements. Still another object of this invention is to provide a frequency discriminating circuit having no tuned elements which operates as a high Q circuit at low frequencies to provide a sharply defined frequency acceptance range. A further object of this invention is to provide a frequency discriminating circuit of the above type which responds only to a frequency signal sustained for a predetermined period of time. Accordingly, an object of this invention is to provide a frequency discriminating circuit including an integrating device.

An additional object of this invention is to provide a frequency discriminating circuit having no tuned elements which does not respond to frequencies below the second harmonic of the lowest desired frequency and does not respond to frequencies above the fundamental of the highest desired frequency. A further object of this invention is to provide a frequency discriminating circuit having no tuned elements which has rapid response characteristics, which discriminates against noise and spurious signals, and which has low current drain.

Another principal object of this invention is to provide a remote control system including a transmitting circuit for providing control signals having different frequencies and including a receiving circuit having novel means for separating the control signals having different frequencies so that they may be used to control different operations. Another object of this invention is to provide a remote control system of this type characterized in that the control signals are transmitted over a relatively small band width. Accordingly, an object of this invention is to provide a remote control system of this type characterized in that the receiving circuit operates as a high Q circuit at low frequencies.

Still another object of this invention is to provide a remote control system including a frequency discriminating circuit having no tuned elements and having an extended low frequency range, i.e., frequencies on the order of 300 c.p.s., which may be used to control remote circuits such as those utilized in conjunction with telemetry, missile, satellite and space probe operations. It is nonetheless an object of this invention to provide a frequency discriminating circuit having no tuned elements but which may be utilized to demodulate FM signals at radio and television frequencies. Accordingly, an object of this invention is to provide a frequency discriminating circuit of this type having a wide frequency range of operation.

A general object of this invention is to provide a remote control system including a transmitting circuit and a receiving circuit characterized in that the transmitting circuit includes a magnetic oscillator and the receiving circuit includes magnetic multivibrators having no tuned elements. An additional general object of this invention is to provide a simple, relatively fool-proof, reliable and economical remote control system including a frequency discriminating circuit.

Another general object of this invention is to provide a frequency discriminating circuit utilizing asymmetrical monostable magnetic multivibrators and bistable magnetic multivibrators in place of high Q filters. Still another general object of this invention is to provide a simple, relatively fool-proof and reliable frequency discriminating circuit capable of operating as a high Q circuit at low frequencies which may be more economically constructed and which is more compact than frequency discriminating circuits using tuned elements.

Other objects and advantages of the invention will become apparent upon reading the attached detailed description and upon reference to the drawings, in which.

While the invention has been described in connection with certain preferred embodiments, it is to be understood that the invention is not to be limited to the disclosed embodiments but, on the contrary, the invention is intended to cover the various modifications and equivalent arrangements included within the spirit and scope of the appended claims.

Figures 1, 2, 4:
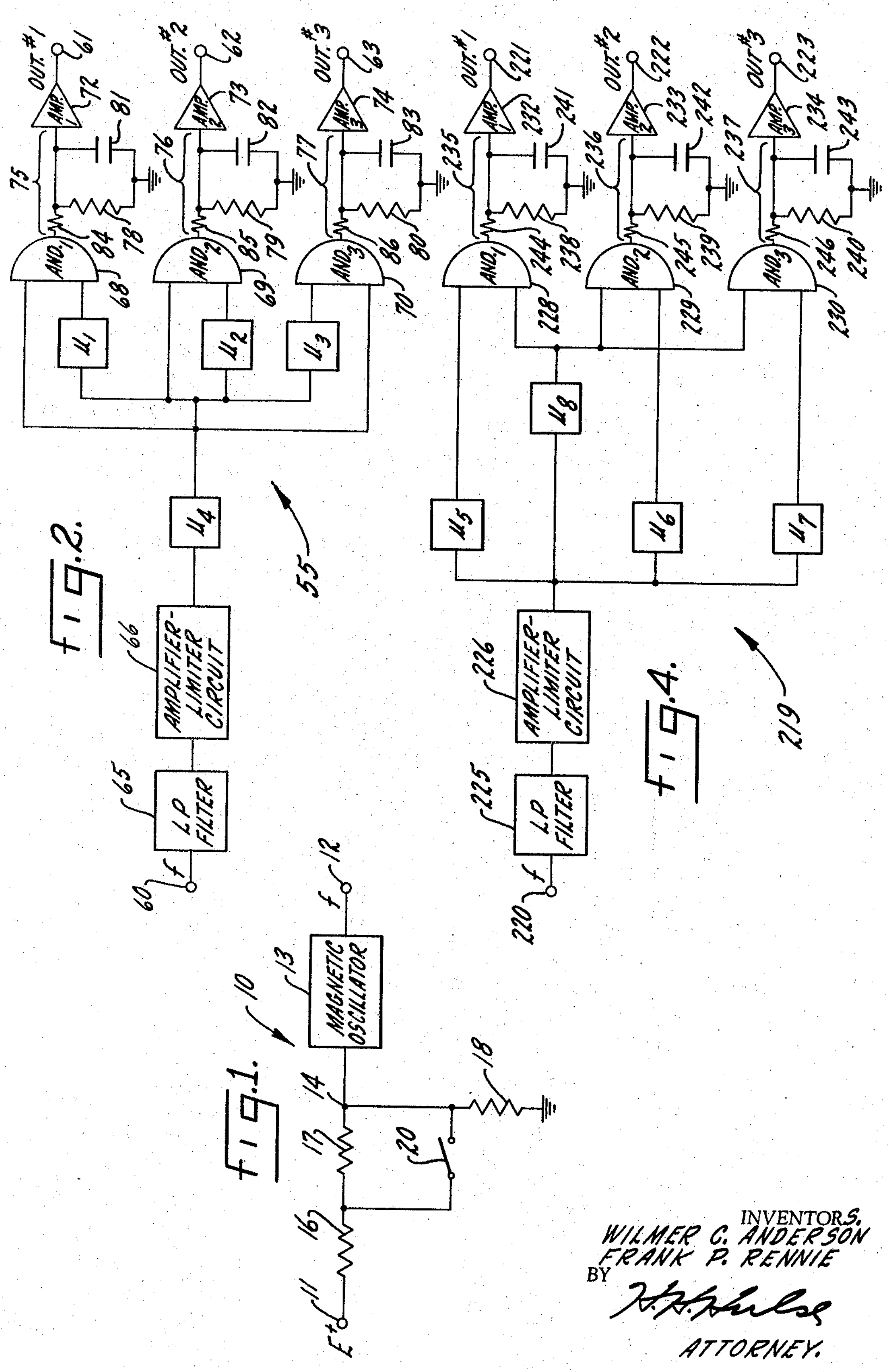
FIGURE 1 is a block diagram of a transmitting circuit.
FIG. 2 is a block diagram of a receiving circuit including a first embodiment of frequency discriminating circuits constructed in accordance with the present invention.
FIG. 4 is a block diagram of a receiving circuit including a second embodiment of frequency discriminating circuits constructed in accordance with the present invention.

Referring to the drawings and more specifically to FIG. 1, a block diagram of a transmitting circuit 10 is illustrated for providing output signals having desired frequencies. The transmitting circuit 10 includes an input terminal 11 and an output terminal 12, and further includes a magnetic oscillator 13 for providing an output signal wherein the frequency of the output signal is dependent upon the input voltage applied to the magnetic oscillator input terminal 14. A supply voltage, designated as E+, is applied to the input terminal 11 of the transmitting circuit, and the voltage applied to the input terminal 14 of the magnetic oscillator 13 is determined by the value of the voltage E+ and the voltage dividing effect of a voltage divider network consisting of resistors 16–18, the voltage at the input terminal 14 being dependent upon the voltage drop across the resistor 18. A switch 20 is provided for shorting out resistor 17 whereby only resistors 16 and 18 act as a voltage divider and a different voltage is developed across the resistor 18 than when the resistor 17 is not shorted out, and, therefore, the input voltage to the magnetic oscillator 13 may be varied between two levels by opening and closing the switch 20 so that the magnetic oscillator output signal frequency is varied between two values. When the switch 20 is opened, the voltage at terminal 14 is equal to the value of the supply voltage E+ divided by the summation of the resistance values of the resistors 16–18 times the resistance value of the resistor 18 and, when the switch 20 is closed, the voltage at terminal 14 is equal to the value of the supply voltage E+ divided by the summation of the resistance values of resistors 16 and 18 times the resistance value of the resistor 18. As will be obvious to one having ordinary skill in the art, any desired voltage supply network may be utilized for varying the input voltage to the magnetic oscillator 13 so that a desired number of output signals may be provided thereby which have different frequencies.

Figures 1A, 2A:
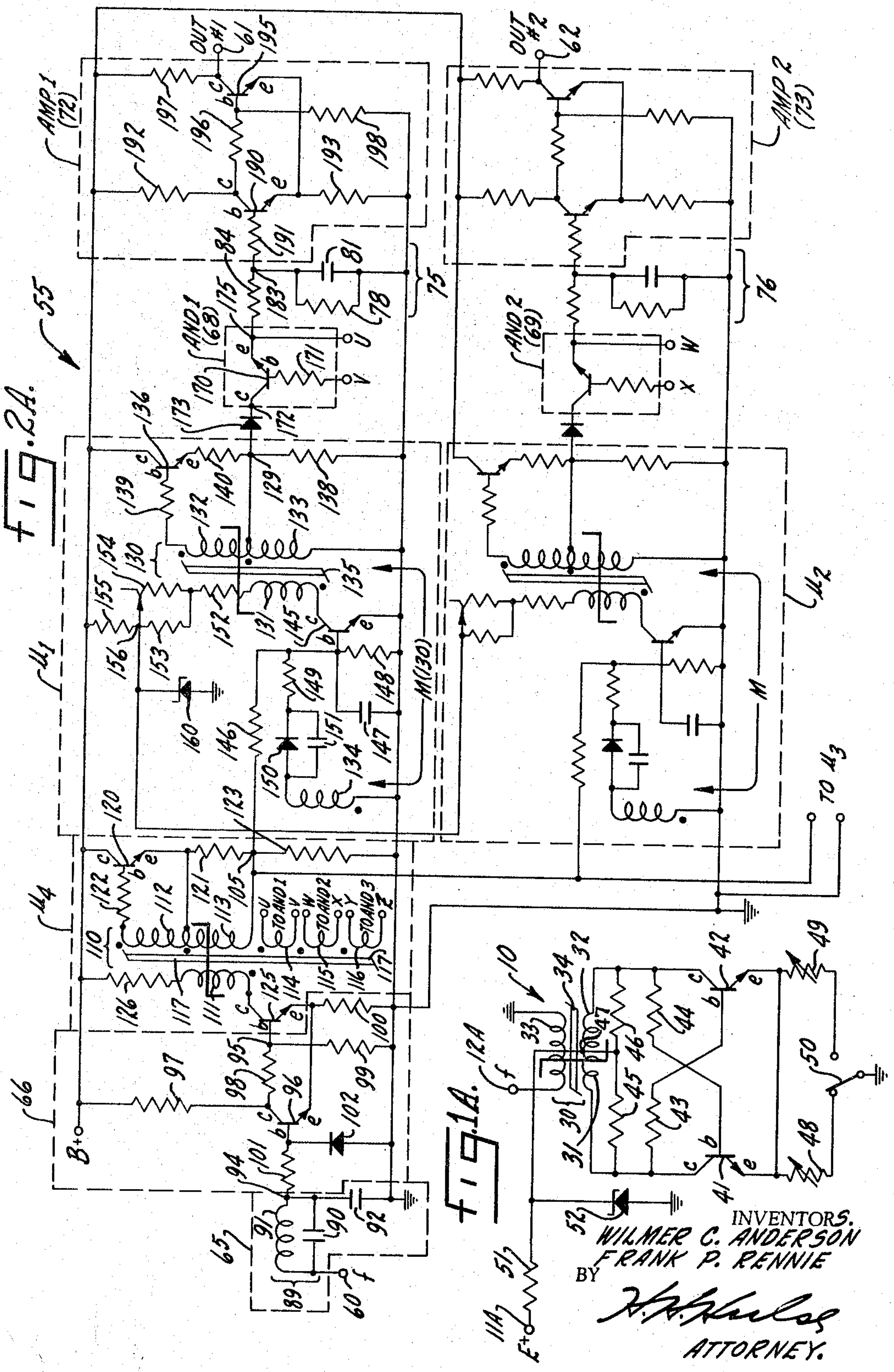
FIG. 1A is a detailed schematic diagram of the transmitting circuit of FIG. 1.
FIG. 2A is a detailed schematic diagram of the receiving circuit of FIG. 2.

Referring to FIG. 1A, the transmitting circuit 10 is illustrated in more detailed form and, more specifically, is illustrated as a magnetic oscillator having an input terminal 11A and an output terminal 12A, which correspond to the input terminal 11 and the output terminal 12 in FIG. 1. The magnetic oscillator includes a saturable transformer 30 having a pair of main windings 31 and 32 and an output winding 33, all wound about a core 34. The core is formed of a readily saturable magnetic material having a generally rectangular hysteresis loop, such material being commercially sold by G. L. Electronics Company under the name "Orthonik" Type P1040. For driving the core into its opposite conditions of saturation, which may for convenience be termed "positive" and "negative" saturation, the windings 31 and 32 are energized by transistors 41 and 42 having base or control circuits which are alternately energized by feedback or "cross" connections including resistors 43 and 44. Damping resistors 45 and 46 are shunted across the transformer windings 31 and 32 respectively. Since NPN transistors are utilized, positive potential is applied to the center terminal 47 of the transformer main windings 31 and 32 for feeding the collectors of the transistors 41 and 42, and the emitters of the transistors are connected to ground through one of two variable resistors 48 and 49, as determined by the presetting of a switch 50 hereinafter described. A supply voltage, again designated as E+, is applied to the input terminal 11A, which is connected to the center terminal 47 of the transformer main windings through a dropping resistor 51. For maintaining the voltage applied to the center terminal 47 substantially constant in the face of changes in the supply voltage E+, a zener diode 52 is connected between the center terminal 47 and ground.

In operation of the transmitting circuit described above, application of the supply voltage causes both of the transistors to tend to conduct, but because of a slight inherent unbalance in the circuit, one transistor will normally tend to conduct more heavily than the other. Conduction in the predominating transistor induces a voltage in the associated transformer winding which is in such a direction as to forward bias the transistor so that the predominating transistor tends to conduct more heavily. In response to conduction of the predominating transistor, the potential at the collector thereof drops and, since the base of the other transisor is connected thereto through the cross-connection, the other transistor is rendered nonconductive. When saturation of the core is reached, the rate of change of flux decreases, hence, by transformer action, the induced forward biasing voltage decreases and the current in the conducting transistor decreases so that the potential at the collector rises. The rising collector potenial turns on the former nonconducting transistor and conduction in this transistor induces a voltage in the associated transformer winding which is in such a direction as to forward bias this transistor so that this transistor tends to conduct more heavily. Conduction in the second transistor causes the potential at the collector thereof to drop so that the former conducting transistor is rendered nonconductive. The current flowing in the second transistor now drives the core to the opposite condition of saturation. This cycle is repeated at a rate which is directly proportional to the applied voltage and inversely proportional to the saturation flux, the number of turns in the transformer winding, and the value of resistance connected between the transistor emitters and ground. Voltage pulses are induced in the output winding 33, as the core switches from one condition of saturation to the other condition of saturation and back again and the voltage pulses constitute the output signal of the transmitting circuit 10. Since the output winding 33 is connected to the output terminal 12A, the output signal is provided at terminal 12A. The output signal provided by the illustrated transmitting circuit as described above will be a square wave signal.

The value of resistance connected between the emitters of the transistors 41 and 42 and ground determines the amount of current flowing through the transistors and the main windings 31 and 32, when the transistors are rendered conductive. Since the time period required for the core to be driven from one state of saturation to the other state of saturation and, thus, the frequency of the magnetic oscillator are dependent upon the voltage applied to the core windings, the number of winding turns and the saturation flux of the core and the voltage applied to the windings 31 and 32 is dependent upon the amount of current flowing therethrough, the time period and the frequency are dependent upon the value of the resistance connected between the emitters of the transistors and ground. The values of the resistors 48 and 49 are preset to be different so that, when they are selectively connected in the transmitting circuit 10 by operation of the switch 50, different values of current flow through the transistors, when rendered conductive, and output signals having different frequencies are provided by the transmitting circuit 10. Various other methods may be utilized to vary the amount of current flowing through the windings 31 and 32, such as varying the value of the voltage applied to the input terminal 11A, so that output signals having desired frequencies are provided at the output terminal 12A. Additionally, it will be obvious to one having ordinary skill in the art that the transmitting circuit may be so designed that any desired number of different frequency signals may be selectively provided thereby.

In accordance with the present invention, a frequency discriminating circuit having an input and an output and including a pair of pulse producing devices is provided for producing a desired output signal in response to the receipt of an input signal having a frequency that falls within an acceptance range of a desired frequency. More specifically, a reference pulse producing device, such as an asymmetrical monostable magnetic multivibrator, is provided which produces a reference pulse having a predetermined length a predetermined delay time period after being triggered and a second pulse producing device, such as a bistable magnetic multivibrator, is provided which produces a control pulse having a predetermined length upon being triggered. The pulse producing devices are triggered in response to prescribed portions of an input signal, and the delay time period of the reference pulse producing device is substantially equal to a multiple of the time period of an input signal having the desired frequency so that, when an input signal having a frequency that falls within the acceptance range is received, portions of a control pulse and the reference pulse overlap timingly. Means are associated with the pulse producing devices for providing the desired output signal in response to such overlap.

Referring to FIG. 2, a block diagram of a receiving circuit 55 is illustrated having an input terminal 60 and output terminals 61–63 which provides an output pulse upon receipt at the input terminal of an input signal having a frequency that falls within an acceptance range of a desired frequency. The receiving circuit 55, as illustrated, includes a plurality of frequency discriminating circuits equal in number to the number of output terminals 61–63, though the receiving circuit may be constructed to include any desired number of frequency discriminating circuits and output terminals. A control pulse producing device $u_4$ is provided for producing a control pulse having a predetermined length when triggered, and three reference pulse producing devices $u_1$–$u_3$ are provided for producing reference pulses having a predetermined length predetermined time periods after being triggered. The pulse producing devices are triggered in response to prescribed portions of an input signal and, when portions of a control pulse and a reference pulse timingly overlap, an output pulse is provided at one of the output terminals 61–63. Each of the frequency discriminating circuits includes one of the reference pulse producing devices and the control pulse producing device.

In the illustrated embodiment, input signals received at the input terminal 60 are applied to a low-pass filter 65 and the output of the low-pass filter is applied to an amplifier-limiter circuit 66, the output of the amplifier-limiter circuit in turn being applied to the control pulse producing device. The low-pass filter filters out undesired frequencies and provides a sine wave output signal having a frequency equal to the frequency of an input signal applied to the input terminal 60, and the amplifier-limiter circuit provides a square wave output signal having a frequency equal to the frequency of the output signal provided by the low-pass filter, the square wave signal being the inverse of the sine wave signal. The control pulse producing device $u_4$ is designed to provide an output pulse in response to each transition of the square wave signal provided by the amplifier-limiter circuit 66, control pulses of a first polarity being provided in response to positive-going transitions and control pulses of a second polarity being provided in response to negative-going transitions. Preferably, the control pulse producing device $u_4$ is a bistable magnetic multivibrator, though it is to be understood that any desired device may be utilized which provided an output pulse in response to each transition of an input signal without departing from the spirit and scope of the invention. The output of the control pulse producing device $u_4$ is connected to gates or switches 68–70, illustrated as AND gates, and is connected to the inputs of the reference pulse producing devices $u_1$–$u_3$.

The reference pulse producing devices $u_1$–$u_3$ are so designed that, predetermined delay time periods after a pulse of a prescribed polarity has been applied thereto by the control pulse producing device reference pulses are provided thereby, the delay time period of each reference pulse producing device being different and corresponding to a multiple of the time period of an input signal having a desired frequency. For the purposes of this invention, the term "multiple" is intended to include fractional and integral multiples. The outputs of the reference pulse producing devices $u_1$–$u_3$ are also connected to the gates 68–70. Preferably, the reference pulse producing devices are asymmetrical monostable magnetic multivibrators which provide asymmetrical double pulse outputs wherein the first pulse of each double pulse output is of a first polarity and has a time period corresponding to a multiple of the time period of an input signal having a desired frequency and the second pulse, which is the reference pulse, is of a second polarity and has a time period equal to the time period of the pulses provided by the control pulse producing device $u_4$, though it is to be understood that the time periods need not be equal and that any desired device may be substituted therefor which provides an output pulse having a predetermined length a predetermined delay time period after being triggered without departing from the spirit and scope of the invention.

If portions of a control pulse having a prescribed polarity and a reference pulse are simultaneously applied to a gate, i.e., the pulses timingly overlap, an output pulse is provided by the gate which indicates that an input signal having a desired frequency has been applied to the input terminal 60. Output pulses provided by the gates 68–70 are transmitted to integrating circuit 75–77 which control the operation of amplifiers 72–74 having their outputs connected to the output terminals 61–63.

Each of the integrating circuits 75–77 includes a series arrangement of a tank circuit, consisting of discharging resistors 78–80 and capacitors 81–83, and charging resistors 84–86 connected between the gate output and ground, and is provided to prevent an output signal from being produced at the associated output terminal in response to spurious signals or noise. The integrating circuits 75–77 only permit an output pulse to be produced at the associated output terminal when output pulses are provided by the associated gate during a predetermined number of succeeding input signal cycles. The capacitors 81–83 are charged in response to output pulses provided by the gates 68–70, the charging time being determined by the values of the capacitors 81–83 and the resistors 84–86, and discharge through the resistors 78–80 when no output pulses are provided by the gates. If output pulses are provided by a gate during a predetermined number of succeeding input signal cycles, the associated capacitor is charged to a sufficient potential to render the associated amplifier operative to produce an output pulse at the associated output terminal.

If desired, the low-pass filter 65 and the amplifier-limiter circuit may be deleted from the receiving circuit 55 so that input signals are applied directly to the control pulse producing device, and the integrating circuits 75–77 and the amplifiers 72–74 may be deleted so that output pulses are provided at the outputs of the AND gates 68–70.

Referring to FIG. 2A, the receiving circuit 55 is illustrated in schematic form. It should be noted that only two of the frequency discriminating circuits illustrated in block form in FIG. 2 are schematically illustrated in FIG. 2A. Additionally, since the three frequency discriminating circuits are identical, only one of the frequency discriminating circuits will be described in detail in the description of the receiving circuit 55.

The low-pass filter 65 has an input terminal corresponding to the input terminal 60 of the receiving circuit 55 so that input signals are applied thereto and has an output terminal 94. The low-pass filter includes a tank circuit 89, consisting of a capacitor 90 and an inductor 91, and also includes a capacitor 92. The tank circuit 89 is connected between the input terminal 60 and the output terminal 94 and the capacitor 92 is connected between the output terminal 94 and ground. The low-pass filter operates to block out undesired frequencies and, in response to the application of a square wave signal, or a signal having almost any wave shape, to the input terminal 60, a sine wave output signal will be provided at the output terminal 94 having a frequency equal to the input signal frequency.

The amplifier-limiter circuit 66 has an input terminal corresponding to the output terminal 94 of the low-pass filter 65 so that the amplifier-limiter circuit is controlled by the output of the low-pass filter and has an output terminal 95. The amplifier-limiter circuit includes a transistor 96 having a base, an emitter and a collector, designated as *b*, *e* and *c*. The collector is connected to a positive supply potential, designated as B+, through a resistor 97 and is connected to ground through a resistor 98, the output terminal 95, and a resistor 99, the resistors 97–99 acting as a voltage divider. The emitter is connected to ground through a resistor 100. The base is connected to the input terminal 94 through a resistor 101 and is connected to ground through a diode 102. When a positive potential is provided at the input terminal 94, it is applied directly to the base of the transistor since the diode 102 prevents current from flowing through the resistor 101 and the transistor 96 is rendered conductive, since it is of the NPN type, so that current flows therethrough. Current flowing through the transistor 96 causes the potential at the collector to drop which in turn alters the voltage dividing effect of the resistors 97–99 so that the output terminal 95 drops proportionately in potential, the voltage drop across resistors 98 and 99 being equal to the voltage drop across the resistor 100 and the transistor 96. When a negative potential is provided at the input terminal 94, the diode 102 clamps the base of the transistor 96 to ground since current flows therethrough and through the resistor 101 so that the transistor 96 is rendered nonconductive and the potential at the collector thereof rises towards the positive potential B+. In response to the rising collector voltage, the potential at the output terminal 95 also rises proportionately. Thus, a square wave output signal is provided at the output terminal 95 in response to the application of a sine wave input signal to the input terminal 94 by the low-pass filter 65, the square wave output signal being the inverse of the sine wave input signal since the output is negative going when the input is positive going and vice versa.

If a clean square wave input is provided, there is no need for the filter 65 and the amplifier-limiter 66.

The control pulse producing device $u_4$ has an input terminal corresponding to the output terminal 95 of the amplifier-limiter circuit 66, so that the control pulse producing device is controlled by the output of the amplifier-limiter circuit, and has a plurality of output terminals 105 and U–Z. The control pulse producing device is illustrated as a bistable magnetic multivibrator constructed in accordance with the principles of U.S. Patent No. 2,897,380, issued July 28, 1959, to C. Neitzert. More specifically, the control pulse producing device includes a saturable reactor 110 having an input winding 111, a triggering winding 112, a reset-output winding 113 and output windings 114–116 wound on a core 117. Output pulses provided at the output terminal 105 are utilized to control operation of the reference pulse producing devices $u_1$–$u_3$ and output pulses provided in the output windings 114–116, across associated ones of the output terminals U–Z, are utilized to control operation of the AND gates 68–70.

When saturation of the core 117 is exceeded in response to current flowing through the winding 111, i.e. the saturable reactor is set, and the current is abruptly terminated, a voltage is induced in the triggering winding 112 which triggers a transistor 120, preferably being of the NPN type, so that current flows through the reset-output winding 113 and the core is driven back to the other state of saturation, i.e. the saturable reactor is reset. A damping resistor 121 is connected across the output winding 113 and base current in the transistor 120 is limited by a series resistor 122. A resistor 123 is connected in series with the resistor 121 and resistors 121 and 123 act as a voltage divider network when the transistor 120 is conducting so that voltage at the common terminal, which is the output terminal 105 of the control pulse producing device, is determined by the current flowing through the resistors and the voltage dividing effect thereof. Output pulses are induced in the output winding 114–116 when the core is driven from one state of saturation to the other state of saturation. To improve the consistency of the square wave input signal applied to the input terminal 95 of the control pulse producing device by the amplifier-limiter circuit 66, a transistor 125 is provided having its base or control terminal connected to the input terminal 95. Current flowing through the transistor 125, when it is rendered conductive, is limited by a series resistor 126 and the previously mentioned resistor 100, the transistor 125 being rendered conductive when a positive-going input is applied at the input terminal 95 and being rendered nonconductive when a negative-going input is applied to the input terminal 95, since the transistor 125 is of the NPN type.

In operation, assume the transistor 125 is conducting and the saturable reactor 110 is set. When the transistor 96 in the amplifier-limiter circuit 66 is rendered conductive, the potential at terminal 95 drops, i.e. a negative-going input is provided, and the transistor 125 in the control pulse producing device is rendered nonconductive, since when transistor 95 conducts its shorts out the base-emitter circuit of transistor 125, so that current flowing through the input winding 111 is abruptly terminated. The collapse of current flowing through the input winding 111 induces a voltage in the triggering winding 112 which renders the transistor 120 conductive so that current flows through the resistors 121 and 123 and the potential at the output terminal 105 rises to a positive value. Current flowing through the transistor 120 also flows through the reset-output winding 113 causing the saturable reactor 110 to be reset for another cycle of operation. After the saturable reactor is reset, the transistor 120 is rendered nonconductive and the potential at the output terminal 105 drops to ground potential. Thus, a positive pulse is provided at the output terminal 105 during the time period when the transistor 120 is conductive. During the time period when the saturable reactor is being reset, output pulses are also induced in the output windings 114–116 which correspond to the output pulse produced at output terminal 105, output terminals U, W and Y being positive with respect to the associated output terminals V, X and Z.

When the transistor 96 in the amplifier-limiter circuit is rendered nonconductive, the potential at terminal 95 rises, i.e. a positive-going input is provided, and the transistor 125 is rendered conductive so that current flows through the input winding 111 causing the saturable reactor to be set. In response to the saturable reactor being set, output pulses are induced in the output windings 113–116. The output pulse induced in the output winding 113 causes a negative output pulse to be provided at the output terminal 105 and the corresponding output pulses provided in the windings 114–116 cause output terminals U, W and Y to be driven negative with respect to the associated output terminals V, X and Z. Subsequently, when the transistor 125 is rendered nonconductive in response to the drop in potential at terminal 95, the cycle repeats itself.

Thus, it may be seen that the control pulse producing device $u_4$ operates to provide output pulses at its output terminals in response to each transition of the input signal applied thereto, positive-going output pulses being provided in response to negative-going input signal transitions and negative output pulses being provided in response to positive-going input signal transitions.

The reference pulse producing device $u_1$ has an input terminal corresponding to the output terminal 105 of the control pulse producing device $u_4$, so that operation of the reference pulse producing device is controlled by the output of the control pulse producing device, and has an output terminal 129, the output of the reference pulse producing device being applied to the input of the AND gate 68. The reference pulse producing device is illustrated as an asymmetrical monostable magnetic multivibrator constructed generally in accordance with the above-mentioned U.S. Patent No. 2,897,380 issued to C. Neitzert.

However, in accordance with an aspect of the present invention, the reference pulse producing device is designed to respond to the application of input pulses having relatively short time periods, e.g., spike-like input pulses, to the input terminal 105. The reference pulse producing device includes a saturable reactor 130 having an input winding 131, a triggering winding 132, an output-reset winding 133 and a control winding 134 all wound on a core 135.

When saturation of the core is exceeded in response to current flowing through the input winding 131, i.e. the saturable reactor is set, and the current flowing therethrough is abruptly terminated, a voltage is induced in the triggering winding 132 which causes a transistor 136 to be rendered conductive so that current flows through the output-reset winding 133 and the core is driven back to the other state of saturation, i.e. the saturable reactor is reset. A damping resistor 138 is connected across the output-reset winding 133 and base current in the transistor 136 is limited by a series resistor 139. A series resistor 140 is connected in series with the transistor emitter and the resistor 138, and resistors 138 and 140 act as a voltage divider network when the transistor 136 is conducting so that the voltage at the common terminal thereof, which is the output terminal 129 of the reference pulse producing device, is determined by current flowing through the resistors and the voltage dividing effect thereof.

To improve the consistency of the input pulses applied to the reference pulse producing device $u_1$ by the control pulse producing device $u_4$, a transistor 145 is provided having its base or control terminal connected to the input terminal 105 through a series resistor 146. The base of the transistor 145 is also connected to ground through the parallel arrangement of a capacitor 147 and a resistor 148 and through the series arrangement of a resistor 149, a diode 150 and a capacitor 151 connected in parallel, and the control winding 134 of the saturable reactor 130, the parallel arrangement and the series arrangement operating to maintain the transistor 145 conducting for a prescribed period of time as will hereinafter be described. Current flowing through the transistor 145, when rendered conductive, flows through the input winding 131 and is limited by the series arrangement of a resistor 152, a resistor 153 and a variable resistor 154 connected in parallel, and a resistor 155. For maintaining the voltage between the lower terminal 156 of the resistor 155 and ground at a substantially constant level in face of changes in the supply voltage B+, a zener diode 160 is connected therebetween.

In operation, when a positive pulse is provided at terminal 105 by the control pulse producing device $u_4$, transistor 145 is rendered conductive, since it is of the NPN type, so that current flows through the input winding 131 causing the saturable reactor 130 to be set. The time required to set the saturable reactor, i.e. to drive the core from a first state of saturation to a second state of saturation, is dependent upon the value of resistance limiting current flow through the transistor 145 which in turn is dependent upon the presetting of the variable resistor 154, as previously set forth with respect to the magnetic oscillator in the transmitting circuit 10.

To maintain the transistor 145 conducting after the positive pulse has ceased to be applied to the input terminal 105, the parallel arrangement including the capacitor 147 and the resistor 148 and the series arrangement including the resistor 149, the diode 150, the capacitor 151 and the control winding 134 are connected between the base and ground. The capacitor 147 charges to the value of the positive input pulse provided by the control pulse producing device. In response to current flowing through the input winding 131, as the transistor conducts, a voltage is induced in the control winding 134, the nondotted terminal being positive with respect to the dotted terminal, which causes charging current to flow through the diode 150 and through the resistor 149 to the capacitor 147 so that the capacitor 147 is not permitted to discharge after the positive pulse ceases to be applied to the input terminal 105. As long as the positive charge is maintained on the capacitor 147, the transistor 145 remains conductive. When the core is saturated, i.e., the saturable reactor is set, the voltage induced in the control winding 134 drops to an essentially zero value so that the capacitor 147 is permitted to discharge through the resistor 148 and the transistor 145 is rendered nonconductive causing the current flowing through the input winding 131 to be abruptly terminated.

During the time period when the transistor 145 is conductive, voltages are induced in the triggering winding 132 and the output-reset winding 133, the dotted terminals thereof being negative with respect to the nondotted terminals, so that the transistor 136 is nonconductive and the potential at the output terminal is negative. In response to the abrupt termination of current flow through the input winding 131 when the transistor 145 is rendered nonconductive, the transistor 136 is rendered conductive so that current flows through the output reset winding 133 causing the saturable reactor to be reset. Current flowing through the transistor 136 also flows through the resistor 138 causing a positive potential to be provided at the output terminal 129. Thus, a negative pulse is provided at the output terminal 129 when the transistor is nonconductive and a positive pulse is provided at the output terminal 129 when the transistor 136 is conductive. The variable resistor 154 is preset so that the time period required for the core to be driven from the first state of saturation to the second state of saturation and, thus, the time period of the negative pulse provided at the output terminal 129 corresponds to a multiple of the time period of an input signal having a desired frequency.

Negative pulses provided at the terminal 105 by the control pulse producing device $u_4$ have no effect on the reference pulse producing device $u_1$ since the transistor 145 is of the NPN type, and the above described cycle of operation is repeated in response to each positive pulse provided at terminal 105.

The reference pulse producing device components are so selected that the time period required for the core 135 to be driven from the first state of saturation to the second state of saturation is greater than the time period required for the core to be driven from the second state of saturation back to the first state of saturation. Therefore, an asymmetrical output signal is provided at the output terminal 129 wherein short positive potential pulses are separated by long negative potential pulses.

The AND gate 68 consists of a transistor 170 having a series resistor 171 connected to its base or control terminal. The transistor 170 also has a collector or input terminal 172 connected to the output terminal 129 of the reference pulse producing device $u_1$ through a diode 173 so that positive pulses provided at the output terminal 129 pass through the diode 173 to the input terminal 172 and has an emitter or output terminal 175. Output terminal 175 is connected to output terminal U of the control pulse producing device output winding 114 and the base of the transistor is connected through the resistor 171 to output terminal V of the output winding 114 so that pulses induced in the winding 114 are applied between the base and the emitter of the transistor 170. When the saturable reactor 110 of the control pulse producing device $u_4$ is being set, a pulse is induced in the output winding 114 which causes output terminal V to be positive with respect to output terminal U so that the transistor 170 is rendered conductive, since it is of the NPN type, and positive pulses provided at the output terminal 129 of the reference pulse producing device during this time period pass through the transistor to the output terminal 175. When the saturable reactor 110 is being reset, a pulse is induced in the output winding 114 which causes terminal V to be negative with respect to terminal U so that the transistor is rendered nonconductive and positive pulses provided at terminal 129 during this time period are not permitted to pass therethrough. Thus, when a positive pulse, i.e. a reference pulse, provided at terminal 129 by the reference pulse producing device and a pulse, i.e. a control pulse, provided in winding 114 by the control pulse producing device, causing terminal V to be positive with respect to terminal U, timingly overlap, a positve pulse is provided at the output terminal 175 of the AND gate 68 which has a time period equal to the period of the overlap.

The integrating circuit 75 is connected between the AND gate output terminal 175 and ground. When a positive pulse is provided at the output terminal 175 of the AND gate 68, the capacitor 81 charges toward the value of the positive pulse through the resistor 84 and, when the positive pulse is no longer provided, the capacitor 81 discharges through the resistor 78. The values of the resistors 78 and 84 and the value of the capacitor are so selected that the capacitor is rapidly charged and slowly discharges.

The amplifier 72 has an output terminal corresponding to the output terminal 61 of the receiving circuit 55 and has an input terminal corresponding to a common terminal 183 of the resistor 84 and the capacitor 81 so that the amplifier 72 is controlled by the charge on the capacitor 81. The amplifier 72 includes a transistor 190 having its base or control terminal connected through a series resistor 191 to the input terminal 183. Series resistors 192 and 193 determine the current flow through the transistor 190 when it is rendered conductive, and the resistors 192 and 193 also determine the voltage levels at the collector and the emitter of the transistor 190. A second transistor 195 has its base or control terminal connected through a series resistor 196 to the collector of the transistor 190 and the transistor 195 is controlled by the operation of the transistor 190. Current flowing through the transistor 195 is limited by series resistors 197 and 193, which also determine the voltage levels at the emitter and the collector of the transistor 195. A resistor 198 is connected between the base of the transistor 195 and ground, and a voltage dividing network is provided by resistors 198, 192 and 196. The transistor 190 is rendered conductive when a prescribed charge has been stored in the capacitor 81 of the integrating circuit 75 and the circuit components are so selected that positive pulses must be provided at the output terminal 175 of the AND gate 68 during a predetermined number of succeeding input signal cycles before a sufficient charge is stored to render the transistor 190 conductive, thus preventing operation in response to spurious signals or noise.

In operation of the amplifier 72, when the capacitor 81 has charge to a sufficient voltage level, the transistor 190 is rendered conductive so that current flows therethrough and the potential at the collector drops due to the voltage drop across the resistor 192. Since the emitter of the transistor 195 is connected to the emitter of the transistor 190 and the base of the transistor 195 is connected to the collector of the transistor 190 and, since the collector to emitter differential voltage is essentially zero volts, the transistor 195 is rendered nonconductive when the transistor 190 is rendered conductive. When the transistor 195 is rendered nonconductive, the potential at the collector thereof rises to the value of the supply voltage B+ and, since the output terminal 61 is connected to the collector, a positive output is provided at the output terminal 61. Subsequently, when capacitor 81 discharges through resistor 78, the transistor 190 is rendered nonconductive so that its collector rises in potential to the value of the supply voltage B+ causing the transistor 195 to be rendered conductive. When the transistor 195 is rendered conductive, the collector thereof drops in potential as determined by the voltage drop across the resistor 197 in response to current flow therethrough and the voltage at the output terminal 61 drops correspondingly. Thus, a positive-going pulse is provided at the output terminal 61 corresponding to the time period that the transistor 195 is rendered nonconductive.

Figure 3:
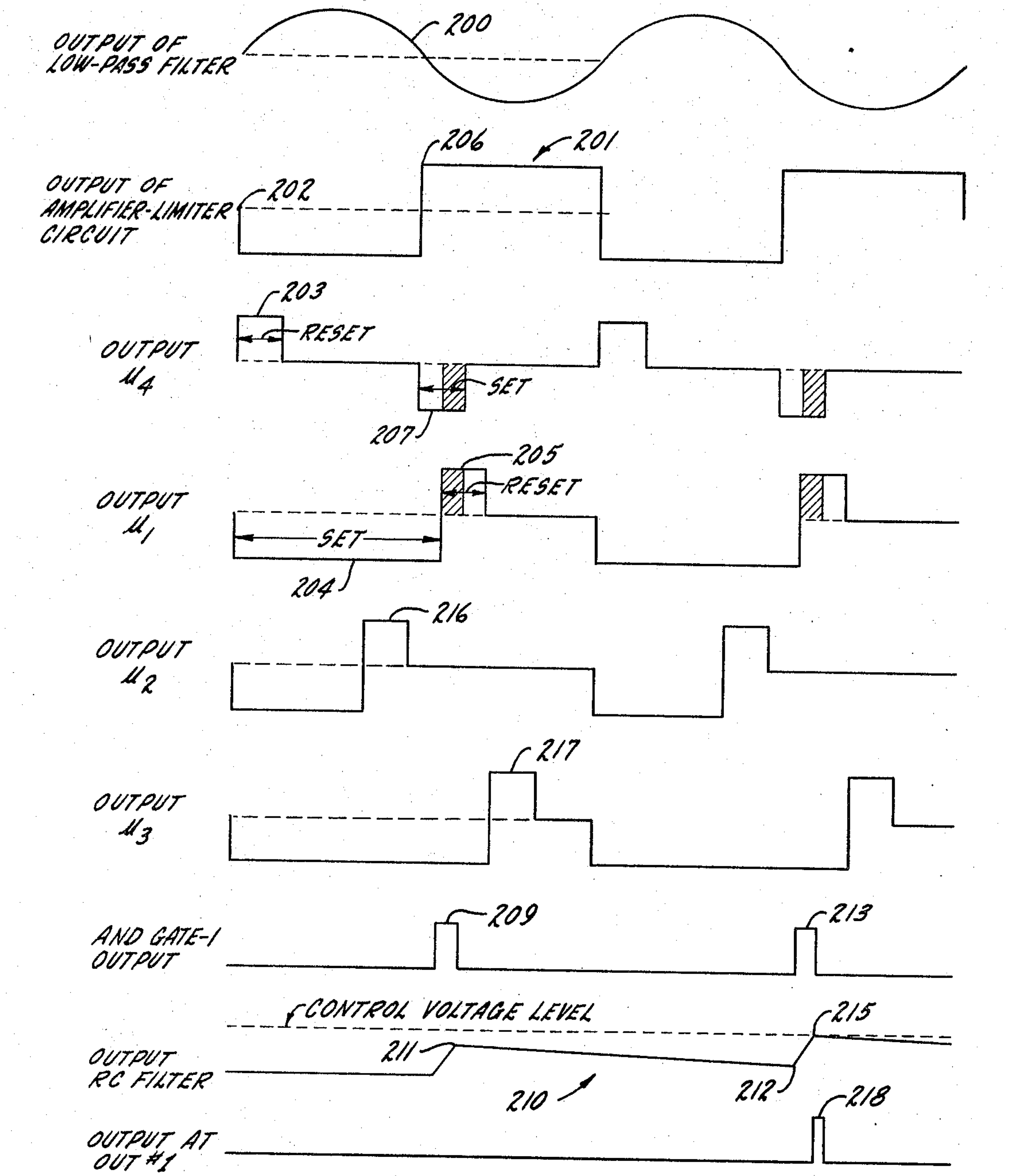
FIG. 3 shows typical waveforms for the receiving circuit of FIGS. 2 and 2A.

Operation of the receiving circuit 55 may be seen more clearly by reference to the wave forms illustrated in FIG. 3. Assuming that a square wave input signal is applied to the input terminal 60, a sine wave similar to wave 200 is provided at the output terminal 94 of the low-pass filter 65, the sine wave having the same time periods and polarities as the square wave input signal. In response to the application of the sine wave 200 to the terminal 94, the amplifier-limiter circuit 66 operates to provide a square wave signal, corresponding to wave 201, at output terminal 95 which controls operation of the control pulse producing device $u_4$. Beginning at point 202 of the square wave 201, the potential at terminal 95 drops to a negative value causing the transistor 125 to be rendered nonconductive so that current flow through the input winding 111 of the saturable reactor 110 is abruptly terminated. In response to the abrupt termination of current flow in the input winding 111, the transistor 120 is rendered conductive causing the saturable reactor 110 to be reset to its first state of saturation and causing a positive pulse to be provided at output terminal 105 of the control pulse producing device, as indicated by pulse 203. Also, in response to the resetting of the saturable reactor 110, a positive voltage pulse is induced in output winding 114 corresponding to pulse 203 such that output terminal U is driven positive with respect to output terminal V. When output terminal U is driven positive with respect to output terminal V, the emitter of the AND gate transistor 170 is driven positive with respect to the base thereof so that the transistor 170 is rendered nonconductive.

In response to the positive pulse 203 provided at the output terminal 105 of the control pulse producing device, the transistor 145 in the reference pulse producing device $u_1$ is rendered conductive so that current flows through the input winding 131 of the saturable reactor 130 causing the core thereof to be driven from the first state of saturation to the second state of saturation, i.e. causing the saturable reactor to be set. During the time period that the core of the saturable reactor 130 is driven from the first state of saturation to the second state of saturation, a negative voltage is induced in the output-reset winding 133, the dotted terminal being negative with respect to the nondotted terminal thereof, such that a negative pulse corresponding to pulse 204 in FIG. 3 is provided at the output terminal 129 of the reference pulse producing device. The time period required for the core of the saturable reactor 130 to be driven from the first state of saturation to the second state of saturation and thus the time period of the negative pulses provided at the output terminal 120 are preset, in the illustrated example, by the presetting of the variable resistor 154 to correspond to the time period of one-half of a cycle of an input signal applied to the input terminal 60 of the receiving circuit 55. When the core of the saturable reactor 130 is saturated, the transistor 145 is rendered nonconductive so that the current flowing through the input winding 131 abruptly terminates and the transistor 136 is rendered conductive causing the core to be driven back to the first state of saturation, i.e., causing the resetting of the saturable reactor. Also, when the transistor 136 is rendered conductive, current flows through the resistor 138 causing a positive pulse to be provided at the output terminal 139 of the reference pulse producing device corresponding to pulse 205 in FIG. 3, the circuit components being so selected that the time period of the pulse 205 is much less than the time period of the pulse 204 and is equal to the time period of the pulse 203.

When point 206 of the square wave 201 provided by the amplifier-limiter circuit is reached, the potential at the output terminal 95 rises to a positive value causing the transistor 125 to be rendered conductive so that current flows through the input winding 111 and the core 117 of the saturable reactor 110 is driven from the first state of saturation to the second state of saturation. During the time period when the core of the saturable reactor 110 is being driven from the first state of saturation to the second state of saturation, a voltage is induced in the triggering winding 112, the dotted terminal being negative with respect to the nondotted terminal, such that the transistor 120 is maintained nonconductive and a small negative output pulse is provided at the output terminal 105, which has no effect on the reference pulse producing device $u_1$. A voltage pulse is also induced in the output winding 114, corresponding to pulse 207 in FIG. 3, the dotted terminal connected to output terminal U being negative with respect to the nondotted terminal connected to output V so that the transistor 170 is rendered conductive since the base thereof is made positive with respect to the emitter and positive pulses provided at the collector may pass therethrough.

If the time period that the transistor 170 is rendered conductive in response to the inducement of a voltage pulse in the output winding 114 overlaps with the time period that a positive output pulse is provided at the output terminal 129, i.e. the pulses timingly overlap as indicated by the cross-hatched portions of output pulses 205 and 207, a positive pulse, corresponding to pulse 209 in FIG. 3, is provided at the output terminal 175 of the AND gate 68 which causes the capacitor 81 in the integrating circuit to be charged as indicated by wave form 210, the capacitor 81 being charged to a voltage level corresponding to point 211. When the output pulse 209 ceases to be provided at terminal 175, the capacitor 81 discharges through resistor 78 so that the voltage across the capacitor 81 decays as indicated by the portion of wave 210 between points 211 and 212. If, during the next cycle of the input signal applied to the input terminal 60 of the receiving circuit 55, a pulse, corresponding to pulse 213 in FIG. 3, is provided at the output terminal 175 of the AND gate 68, the capacitor 81 will charge to a level corresponding to point 215 in wave form 210, which, in the illustrated example, is the control voltage level required to render the transistor 190 in the amplifier 72 conductive so that the transistor 195 is rendered nonconductive and a positive-going output pulse 218 is provided at the output terminal 61 of the receiving circuit 55, the output pulse at terminal 61 indicating that the frequency of the input signal applied to the input terminal 60 falls within an acceptance range of a desired frequency.

The time period between pulses 203 and 207 in FIG. 3 corresponds to a half-period of the frequency of the input signal applied to the input terminal 60 and, since the time period of the pulse 204 is preset to correspond to a half-period of the frequency of the input signal having the desired frequency and since the time period of the pulse 205 corresponds to the acceptance range, it may be seen that an output pulse 209 is provided at the output terminal 175 of the AND gate 68 when pulses 205 and 207 timingly overlap.

It should be noted that the ordinary On-Off remote control operations, pulses 205 and 207 completely overlap timingly.

Referring to FIG. 3, it may be seen that asymmetrical output signals are also provided by the reference pulse producing devices $u_2$ and $u_3$ wherein the respective positive reference pulses 216 and 217 do not timingly overlap the control pulse 207 provided by the control pulse producing device $u_4$. As previously mentioned, descriptions of the frequency discriminating circuits which include the reference pulse producing devices $u_2$ and $u_3$ will not be provided since they are identical to the frequency discriminating circuit described above.

In accordance with another aspect of the invention, the transmitting circuit 10, illustrated in FIGS. 1 and 1A, may be combined with the receiving circuit 55, illustrated in FIGS. 2 and 2A, by connecting terminals 12 and 60 together so that a remote control system is provided. With this arrangement, output signals having selected frequencies may be provided by the transmitting circuit 10 which are transmitted to the receiving circuit 55 to cause selected ones of the discriminating circuits in the receiving circuit to operate to selectively provide output pulses at the associated output terminals, the output pulses being utilizable to control remote operations, i.e., operations which are remotely located with respect to the transmitting circuit.

In accordance with still another aspect of the invention, a second receiving circuit 219 (FIG. 4) is provided which operates in a similar manner to the receiving circuit 55. The receiving circuit 219 has an input terminal 220, and output terminals 221–223 and provides an output pulse at one of the output terminals 221–223 upon receipt at the input of an input signal having a frequency that falls within an acceptance range of a desired frequency. Similar to the receiving circuit 55, the receiving circuit 219 includes frequency discriminating circuits equal in number to the number of output terminals 221–223, though the receiving circuit 219 may also be constructed to include any desired number of frequency discriminating circuits and associated output terminals. A control pulse producing device $u_8$ is provided for producing a control pulse having a predetermined length when triggered, and three reference pulse producing devices $u_5$–$u_7$ are provided for producing reference pulses having a predetermined length predetermined time periods after being triggered. The pulse producing devices are triggered in response to prescribed portions of an input signal and, when portions of a control pulse and a reference pulse timingly overlap, an output pulse is provided at one of the output terminals 221–223. Each of the frequency discriminating circuits includes one of the reference pulse producing devices and the control pulse producing device.

Input signals received at the input terminal 220 are applied to a low-pass filter 225 and the output of the low-pass filter is applied to an amplifier-limiter circuit 226, the output of the amplifier-limiter circuit in turn being applied to the pulse producing devices $u_5$–$u_8$. The low-pass filter 225 and the amplifier-limiter circuit 226 are identical to the low-pass filter 65 and the amplifier-limiter circuit 66 in the receiving circuit 55 of FIG. 2. Thus, the low-pass filter 225 filters out undesired frequencies and provides a sine wave signal having a frequency equal to the frequency of an input signal applied to the input terminal 220, and the amplifier-limiter circuit provides a square wave signal having a frequency equal to the frequency of the signal provided by the low-pass filter, the square wave signal being the inverse of the sine wave signal. The control pulse producing device $u_8$ may be identical to the control pulse producing device $u_4$ in FIG. 2 and, therefore, may be designed to provide an output pulse in response to each transition of the square wave signal provided by the amplifier-limiter circuit 226, pulses of a first polarity being provided in response to positive-going transitions and pulses of a second polarity being provided in response to negative-going transitions. However, since in the receiving circuit 219 the control pulse producing device $u_8$ does not control operation of the reference pulse producing devices $u_5$–$u_7$, the reference pulse producing device $u_8$ may be designed to provide an output pulse only in response to a transition of the square wave signal provided by the amplifier-limiter circuit 66 which is positive going. Preferably, the control pulse producing device $u_8$ is designed so that it only responds to positive-going transitions and is a monostable multivibrator, though it is to be understood that any desired device may be utilized which provides an output pulse having a desired polarity in response to a selected transition of an input signal without departing from the spirit and scope of the invention. The output of the control pulse producing device $u_8$ is connected to gates or switches 228–230, illustrated as AND gates.

The reference pulse producing devices $u_5$–$u_7$ are identical to the reference pulse producing devices $u_1$–$u_3$ and, thus are so designed that, predetermined delay time periods after a pulse of a prescribed polarity are applied thereto, reference pulses are provided thereby, the delay time period of each reference pulse producing device being different and corresponding to a multiple of the time period of an input signal having a desired frequency. Since the reference pulse producing devices $u_5$–$u_7$ correspond to the reference pulse producing devices $u_1$–$u_3$, they are also preferably asymmetrical monostable magnetic multivibrators, though it is to be understood that any desired device may be substituted therefor which provides an output pulse having a predetermined length a predetermined time period after being triggered without departing from the spirit and scope of the invention. The outputs of the reference pulse producing devices $u_5$–$u_7$ are also connected to the gates 228–230.

If portions of a control pulse and a reference pulse are simultaneously applied to an AND gate, i.e. the pulses timingly overlap, an output pulse is provided by the gate which indicates that an input signal having a desired frequency has been applied to the input terminal 220. Output pulses provided by the gates 228–230 are transmitted to integrating circuits 235–237 which control the operation of amplifiers 233–234 having their outputs connected to the output terminals 221–223. Each of the integrating circuits 235–237 includes a series arrangement of a tank circuit, consisting of a discharging resistor 238–240 and a capacitor 241–243 and a charging resistor 244–246 connected between the gate output and ground, and, like the integrating circuits 75–77 in FIG. 2, is provided to prevent an output signal from being provided at the associated output terminal in response to spurious signals or noise. The integrating circuits 235–237 only permit an output pulse to be provided at the associated output terminal when output pulses are provided by the associated gate during a predetermined number of succeeding input signal cycles, and the integrating circuits operate as the above described integrating circuits 75–77.

Operation of the receiving circuit 219 may be seen more clearly by reference to FIG. 3. The receiving circuit 219 operates similar to the receiving circuit 55 except that the reference pulse producing devices $u_5$–$u_7$ are controlled by the output of the amplifier-limiter circuit 226 rather than by the control pulse producing device $u_8$. The reference pulse producing devices $u_5$–$u_7$ will provide output signals corresponding to those illustrated in FIG. 3 for the reference pulse producing devices $u_1$–$u_3$ respectively, and the control pulse producing device $u_8$ will provide an output signal corresponding to that illustrated in FIG. 3 for the control pulse producing device $u_4$, except that with this arrangement, pulse 203 need not be provided by the control pulse producing device but rather only pulse 207 is required for correct operation of the receiving circuit 219. With the preferred monostable multivibrator only the output pulse 207 is provided. An output signal consisting of pulse 204 and pulse 205 will be provided by the reference pulse producing device $u_5$ in response to a negative-going transition of the square wave signal provided by the amplifier-limiter circuit 226 at point 202 in wave form 201. In response to the positive-going transition of the square wave signal provided by the amplifier-limiter circuit at point 206, a pulse is provided by the control pulse producing device $u_8$ corresponding to pulse 207. If the time periods of pulse 207 and pulse 205, respectively provided by the control pulse producing device $u_8$ and the reference pulse producing device $u_5$, timingly overlap, as indicated by the cross-hatched portions thereof, the AND gate 228 is rendered operative to provide an output pulse corresponding to pulse 209. Output pulses provided by the gate 228 cause the capacitor 241 of the integrating circuit 235 to be charged as indicated by wave form 210 and, if output pulses are provided by the AND gate 228 during a prescribed number of succeeding input signal cycles, the charge of the capacitor 241 is sufficient, as indicated by point 215 of wave form 210, to cause the amplifier 232 to be rendered operative to provide an output pulse 218 at output terminal 221, the output pulse at terminal 221 indicating that the frequency of the input signal falls within the acceptance range of the desired frequency.

The receiving circuit 219 may also be combined with the transmitting circuit 10 by connecting terminals 12 and 220 together so that a remote control system is provided thereby.

Since the outputs of the pulse producing devices are square wave pulses, a sharply defined overlapping region thereof is provided when the input signal frequency falls within the acceptance range of a desired frequency, as illustrated by pulses 209 and 213 in FIG. 3, so that a sharply defined frequency acceptance range is provided by the frequency discriminating circuits without tuned circuits being used, the frequency acceptance range being variable so that it may be preset to any desired range. Additionally, since the widths of the pulses provided by the pulse producing devices are variable and may be made small, a discriminating circuit has been provided which is capable of separating different carriers, i.e., signals having different frequencies, transmitted within a relatively small band width. For example, assume that the delay time period of a reference pulse producing device is 5,000 microseconds and assume that the length of the reference pulse provided thereby is 100 microseconds. For overlap, then, the selected time period of an input signal must fall within the range of 4,900 microseconds to 5,100 microseconds, corresponding to a frequency range of 98 cycles to 102 cycles. Considering only one half of this range as useful for discriminator purposes, since the other half is mirror image and introduces an uncertainty factor, we have a linear discriminator for the frequency range from 98 cycles to 100 cycles, or only 2 cycles wide with the 100 cycles. With this arrangement, 10 channels of information could be carried in a 100 cycle pass band if we allow a 10 cycle separation between channels.

Frequency discriminating circuits constructed in accordance with the present invention are capable of operating with input signals having low frequencies on the order of 300 c.p.s. and are also capable of operating with input signals at radio and video frequencies, thus providing a wide frequency range of operation. Also, the disclosed frequency discriminating circuit may be modified as described hereinabove so that an input signal must be sustained for a predetermined period of time before an output pulse is provided, the circuit thereby discriminating against noise and spurious signals, and so that the circuit operates to block out undesired frequencies such as those above the fundamental desired frequency.

Further, it may be seen that a remote control system has been provided wherein a carrier signal may be transmitted from a transmitting circuit over a relatively small band width to a receiving circuit, which includes a frequency discriminating circuit for separating carriers and providing a pulse for controlling remote operations, characterized in that no tuned elements are required. The remote control system may be utilized to control operations in conjunction with telemetry, missile, space probe and the like operations.

We claim as our invention:

1. In a frequency discriminating circuit having an input and an output for producing an output signal upon receipt at the input of an input signal having a frequency that falls within the acceptance range of a desired frequency, the combination comprising, an asymmetrical monostable multivibrator for producing a reference pulse having a predetermined length a predetermined delay time interval after being triggered, a control pulse producing device for producing a control pulse having a predetermined length upon being triggered, input means responsive to an input signal for triggering the pulse producing devices, the delay time interval of the reference producing device being substantially equal to a multiple of the time period of an input signal having the desired frequency so that when an input signal is received which has a frequency that falls within the acceptance range, the control pulse and the reference pulse timingly overlap, and means for producing an output signal in response to such overlap.

2. In a frequency discriminating circuit having an input and an output for producing an output signal upon receipt at the input of an input signal having a frequency that falls within the acceptance range of a desired frequency, the combination comprising, a reference pulse producing device for producing a reference pulse having a predetermined length a predetermined delay time interval after being triggered, a control pulse producing device for producing a control pulse having a predetermined length upon being triggered, input means responsive to an input signal for triggering the pulse producing devices, the delay time interval of the reference producing device being substantially equal to a multiple of the time period of an input signal having the desired frequency so that when an input signal is received which has a frequency that falls within the acceptance range, the control pulse and the reference pulse timingly overlap, means for producing a D.C. output pulse in response to such overlap, said output pulse having a predetermined amplitude which is essentially independent of the amplitudes of said reference and control pulses and an integrating device responsive to a predetermined number of successive D.C. output pulses for providing an output control signal.

3. In a frequency discriminating circuit having an input and an output for producing an output control signal upon receipt at the input of an input signal having a frequency that falls within an acceptance range of a desired frequency, the combination which comprises, an asymmetrical monostable multivibrator for producing a reference pulse having a predetermined length upon being triggered, a control pulse producing device for producing a control pulse having a predetermined length upon being triggered, input means responsive to an input signal for triggering the pulse producing devices, means for delaying the producing of a reference pulse by the reference pulse producing device for a time interval after triggering substantially equal to a multiple of the time period of an input signal having the desired frequency so that when an input signal is received which has a frequency that falls within the acceptance range portions of a control pulse and the reference pulse timingly overlap, and means for producing in response to such overlap an output control signal having a desired magnitude which is unaffected by variations in the magnitudes of said control and reference pulses.

4. In a frequency discriminating circuit having an input and an output for producing an output control signal upon receipt at the input of an input signal having a frequency that falls within an acceptance range of a plurality of desired frequencies, the combination which comprises, a plurality of reference pulse producing devices for producing reference pulses having predetermined lengths upon being triggered, a control pulse producing device for producing a control pulse having a predetermined length upon being triggered, a common input means responsive to an input signal for triggering all of said pulse producing devices, means associated with each reference pulse producing device for delaying the producing of a reference pulse by the associated reference pulse producing device for a time interval after triggering substantially equal to a multiple of the time period of an input signal having a selected one of the desired frequency so that when an input signal is received which has a frequency that falls within the acceptance range of the selected frequency portions of pulses provided by the control pulse producing device and a reference pulse producing device timingly overlap, and means for producing an output control signal having a desired magnitude in response to such overlap.

5. In a frequency discriminating circuit having an input and an output for producting an output control signal upon receipt at the input of an input signal having a frequency that falls within an acceptance range of a desired frequency, the combination which comprises, a reference pulse producing device for producing a reference pulse having a predetermined length upon being triggered, a control pulse producing device for producing a control pulse having a predetermined length upon being triggered, input means responsive to an input signal for triggering the pulse producing devices, means for delaying the producing of a reference pulse by the reference pulse producing device for a time interval after triggering substantially equal to a multiple of the time period of an input signal having the desired frequency so that when an input signal is received which has a frequency that falls within the acceptance range portions of a control pulse and the reference pulse timingly overlap, means for producing an output control pulse in response to such overlap, and an integrating device responsive to a predetermined number of successive output control pulses for providing a control signal having a desired magnitude.

6. In a frequency discriminating circuit having an input and an output for producing an output control signal upon receipt at the input of an input signal having a frequency that falls within an acceptance range of a desired frequency, the combination which comprises, a reference pulse producing device for producing a reference pulse having a predetermined length upon being triggered, a control pulse producing device for producing a control pulse having a predetermined length upon being triggered, input means responsive to an input signal for triggering the pulse producing devices, means for delaying the producing of a reference pulse by the reference pulse producing device for a time interval after triggering substantially equal to a multiple of the time period of an input signal having the desired frequency so that when an input signal is received which has a frequency that falls within the acceptance range portions of a control pulse and the reference pulse timingly overlap, a gating device connected to the outputs of the pulse producing devices for producing a coincidence pulse in response to such overlap said coincidence pulse having a magnitude which is unaffected by variations in the magnitude of said control and reference pulses, and an integrating device connected to the gating device output for providing a control signal having a desired magnitude when a predetermined number of successive control pulses are provided by the gating device.

7. In a frequency discriminating circuit having an input and an output for producing an output control signal upon receipt at the input of an input signal having a frequency that falls within an acceptance range of a desired frequency, the combination which comprises, a control circuit responsive to prescribed portions of an input signal which includes at least one asymmetrical monostable multivibrator each for producing a prescribed reference pulse having a predetermined length a different predetermined delay time interval after being triggered and a control multivibrator for producing a control pulse having a predetermined length upon being triggered, the multivibrators being triggered by the prescribed portions of an input signal, the delay time interval of the asymmetrical monostable multivibrator being substantially equal to a multiple of the time period of an input signal having a specific desired frequency so that when an input signal is received which has a frequency that falls within the acceptance range of the specific desired frequency portions of a control pulse and a reference pulse timingly overlap, and means for producing a control signal having a desired magnitude in response to such overlap.

8. In a frequency discriminating circuit having an input and an output for producing an output control signal upon receipt at the input of a cyclical input signal having a frequency that falls within an acceptance range of a desired frequency and having first and second sharp transitions during each cycle, the combination which comprises, at least one asymmetrical monostable magnetic multivibrator each for providing a different asymmetrical double pulse reference output in response to the first transition during each input signal cycle, the time period of the first pulse of the double pulse reference output being substantially equal to the time period of an input signal having a desired frequency, a monostable control multivibrator for providing a control pulse in response to the second transition during each input signal cycle, and at least one gating circuit, the number of gating circuits corresponding to the number of asymmetrical monostable magnetic multivibrators, each gating circuit being connected to the output of the monostable control multivibrator and to the output of an asymmetrical monostable magnetic multivibrator and providing an output control signal having a desired magnitude when portions of pulses having prescribed polarities are simultaneously applied thereto.

9. In a frequency discriminating circuit having an input and an output for producing an output control signal upon receipt at the input of a cyclical input signal having a freqeuncy that falls within an acceptance range of a desired frequency and having first and second sharp transitions during each cycle, the combination which comprises, a bistable magnetic multivibrator for providing a first polarity control pulse and a second polarity control pulse respectively in response to the first and second transitions during each input signal cycle, at least one asymmetrical monostable magnetic multivibrator each for providing a different asymmetrical double pulse reference output in response to the first transition during each input signal cycle, the time period of the first pulse of the double pulse reference output being substantially equal to the time period of an input signal having a desired frequency, and at least one gating circuit, the number of gating circuits being equal in number to the number of asymmetrical monostable magnetic multivibrators, each gating circuit being connected to the output of the bistable magnetic multivibrator and to the output of an asymmetrical monostable magnetic multivibrator and providing an output control signal having a desired magnitude when portions of pulses having prescribed polarities are simultaneously applied thereto.

10. In a remote control system, the combination which comprises, a transmitting circuit for providing an alternating signal, adjustable means for varying the frequency of the transmitting circuit signal to frequencies representative of remote operations to be controlled, a control pulse producing device for producing a control pulse having a predetermined length upon being triggered, a plurality of reference pulse producing devices equal in number to the number of remote operations to be controlled connected to the control pulse producing device output for producing reference pulses having a predetermined length predetermined delay time intervals after being triggered, the control pulse producing device being triggered by prescribed portions of the transmitting circuit signal and the reference pulse producing devices being triggered by prescribed control pulses from the control pulse producing device, the delay time interval of each reference pulse producing device being substantially equal to a multiple of the time period of a transmitting circuit output signal having a frequency representative of a remote operation to be controlled so that when a transmitting circuit output signal is provided which has a frequency representative of a remote operation to be controlled, portions of a control pulse and a reference pulse timingly overlap, and means for producing an output control signal in response to such overlap.

11. In a remote control system, the combination which comprises, a transmitting circuit for providing an alternating signal, adjustable means for varying the frequency of the transmitting circuit signal to frequencies representative of remote operations to be controlled, a plurality of reference pulse producing devices equal in number to the number of remote operations to be controlled for producing reference pulses having a predetermined length upon being triggered, a control pulse producing device for producing a control pulse having a predetermined length upon being triggered, means connected to the transmitting circuit output for triggering the pulse producing devices in response to prescribed portions of the transmitting circuit output signal, means for delaying the producing of a reference pulse by each reference pulse producing device for a different time interval after triggering substantially equal to a multiple of the time period of a transmitting circuit output signal having a frequency representative of a remote operation to be controlled so that when a transmitting circuit output signal is provided which has a frequency representative of a remote operation to be controlled, portions of a control pulse and a reference pulse timingly overlap, and means for producing an output control signal having a desired magnitude in response to such overlap.

12. In a remote control system, the combination which comprises, a transmitting circuit for providing an alternating signal, adjustable means for varying the frequency of the transmitting circuit signal to frequencies representative of remote operations to be controlled, a plurality of reference pulse producing devices equal in number to the number of remote operations to be controlled for producing reference pulses having a predetermined length upon being triggered, a control pulse producing device for producing a control pulse having a predetermined length upon being triggered, means connected to the transmitting circuit output for triggering the pulse producing devices in response to prescribed portions of the transmitting circuit signal, means for delaying the producing of a reference pulse by each reference pulse producing device for a different time interval after triggering substantially equal to a multiple of the time period of a transmitting circuit output signal having a frequency representative of a remote operation to be controlled so that when a transmitting circuit output signal is provided which has a frequency representative of a remote operation to be controlled, portions of a control pulse and a reference pulse timingly overlap, and a plurality of gating devices equal in number to the number of reference pulse producing devices, each gating device being connected to the output of the control pulse producing device and to the output of a reference pulse producing device and producing an operation control signal having a desired magnitude when portions of pulses are simultaneously applied thereto by the associated pulse producing devices.

13. In a remote control system, the combination which comprises, a transmitting circuit for providing an alternating signal, adjustable means for varying the frequency of the transmitting circuit signal to frequencies representative of remote operations to be controlled, a control circuit connected to the transmitting circuit output and responsive to prescribed portions of the transmitting circuit signal which includes at least one reference pulse producing device each for producing a reference pulse having a predetermined length a different predetermined delay time interval after being triggered and a control pulse producing device for producing a control pulse having a predetermined length upon being triggered, the number of reference pulse producing devices being equal to the number of remote operations to be controlled, the pulse producing devices being triggered by the prescribed portions of the transmitting circuit signal, the delay time interval of each reference pulse producing device being substantially equal to a multiple of the time period of a transmitting circuit output signal having a frequency representative of a remote operation to be controlled so that when a transmitting circuit output signal is provided which has a frequency representative of a remote operation to be controlled, portions of a control pulse and a reference pulse timingly overlap, and means for producing an operation control signal having a desired magnitude in response to such overlap.

14. In a remote control system, the combination which comprises, a transmitting circuit for providing a cyclically alternating signal having first and second sharp transitions during each cycle, adjustable means for varying the frequency of the transmitting circuit signal to frequencies representative of remote operations to be controlled, a bistable magnetic multivibrator connected to the transmitting circuit output and providing a first polarity control pulse and a second polarity control pulse respectively in response to the first and second transistors during each transmitting circuit signal cycle, at least one asymmetrical monostable magnetic multivibrator connected to the output of the bistable magnetic multivibrator and each providing an asymmetrical double pulse reference output in response to control pulses of the first polarity from the bistable magnetic multivibrator, the number of asymmetrical multivibrators being equal to the number of remote operations to be controlled, the time period of the first pulse of the double pulse reference output of each asymmetrical multivibrator being substantially equal to the time period of a transmitting circuit output signal having a frequency representative of a remote operation to be controlled, and at least one gating circuit, the number of gating circuits corresponding to the number of asymmetrical multivibrators, each gating circuit being connected to the output of the bistable multivibrator and to the output of an asymmetrical multivibrator and providing an output control pulse having a desired magnitude when portions of pulses having prescribed polarities are simultaneously applied thereto by the associated multivibrators.

15. In a frequency discriminating circuit having an input and an output for producing an output signal upon receipt at the input of an input signal having a frequency that falls within the acceptance range of a desired frequency, the combination which comprises, a device for producing upon being triggered a control pulse having a predetermined length, a magnetic core having first and second saturation states, an input winding linking said core, means for carrying current, input switching means connected to said pulse producing means and in series between said current carrying means and said input winding and responsive to said control pulse to send current through said input winding to switch said core from its first to its second saturation state, a control winding linking said core, connected to said switching means, and responsive to said core being driven towards its second saturation state to cause said switching means to continue to send current through said input winding so as to drive said core toward its second saturation state even after said input signal has ceased, winding means linked to said core, a second switching means and a second means for carrying current in circuit with said winding means, said second switching means being responsive to signal induced in said winding means during switching of said core toward its second saturation state to produce a voltage pulse of a first polarity and being operative to produce a signal reference pulse of a second polarity and to drive said core back to its first saturation state over a second time period which is shorter than said first time period in response to said core reaching its second saturation state, input means responsive to an input signal for triggering said control pulse producing device, the total time to switch said core from its first to its second saturation state being substantially equal to a multiple of the time period of an input signal having the desired frequency so that when an input signal is received which has a frequency that falls within the acceptance range, the control pulse and the reference pulse timingly overlap, and means for producing an output signal in response to such overlap.

16. In a frequency discriminator circuit having an input, a generator for producing control pulses of predetermined length in response to successive input signals at said input, and a coincidence detector having one input connected to the output of said generator, an asymmetric monostable multivibrator for producing in response to each said input signal a reference pulse having a predetermined length a predetermined delay time interval after being triggered, comprising in combination a saturable reactor including a magnetic core having two saturation states, an input winding linking said core, means for carrying current, switching means connected between said current carrying means and said winding and responsive to said input signals to send current through said winding so as to switch said core from its first to its second saturation state, a control winding linking said core, connected to said switching means, and responsive to said core being driven toward its second saturation state to cause said switching means to drive current through said input winding at a preset rate even after said input signal has ceased, winding means linked to said core and a second switching means in circuit with said winding means, said second switching means being responsive to said winding means during switching of said core towards its second saturation state to produce a voltage pulse of a first polarity, and being operative to drive said core back to its first saturation state over a second time period which is shorter than said first time period by driving current through said winding means in response to said core reaching its second saturation state, said second switching means also being operative to produce a reference pulse of a second polarity during said second time period at a second input of said coincidence detector.

References Cited by the Examiner

UNITED STATES PATENTS

| | | | |
|---|---|---|---|
| 2,577,827 | 12/1951 | Tompkins | 328—112 |
| 2,668,236 | 2/1954 | McCoy | 328—113 |
| 2,716,189 | 8/1955 | Ayres | 328—138 |
| 2,795,775 | 6/1957 | Faymoreau et al. | 340—167 |
| 2,910,582 | 10/1959 | Muckenhirn | 328—138 X |
| 2,950,463 | 8/1960 | Brunn | 340—167 |
| 3,122,647 | 2/1964 | Huey | 307—88.5 |

NEIL C. READ, *Primary Examiner.*

H. I. PITTS, *Assistant Examiner.*